United States Patent [19]

Ando

[11] 3,845,248

[45] Oct. 29, 1974

[54] TELEPHONE AUTO-ANSWERING DEVICE WITH RECORD MEDIUM SUBSTITUTION

[75] Inventor: Shizuo Ando, Tokorozawa, Japan

[73] Assignee: Pioneer Electronic Corporation, Tokyo, Japan

[22] Filed: Dec. 18, 1972

[21] Appl. No.: 315,968

[30] Foreign Application Priority Data

Dec. 16, 1971 Japan .............................. 46-102143

[52] U.S. Cl. ......................... 179/6 R, 179/100.1 DR

[51] Int. Cl. ........................................... G11b 15/06

[58] Field of Search ....... 179/6 R, 100.1 S, 100.2 S, 179/100.2 R, 100.4 PT; 242/191; 352/174

[56] References Cited

UNITED STATES PATENTS

| | | | |
|---|---|---|---|
| 3,086,086 | 4/1963 | Ernst et al. | 179/100.4 PT |
| 3,499,993 | 9/1965 | Owen et al. | 179/6 R |
| 3,627,228 | 12/1971 | Wolfe | 242/191 |
| 3,687,397 | 8/1972 | Suzuki et al. | 242/191 |
| 3,705,961 | 12/1972 | Nye et al. | 179/100.1 DR |
| 3,730,453 | 5/1973 | Hotchkiss et al. | 242/191 |
| 3,779,483 | 12/1973 | Inove | 242/191 |

FOREIGN PATENTS OR APPLICATIONS

| | | | |
|---|---|---|---|
| 1,056,277 | 1/1967 | Great Britain | 179/6 R |

*Primary Examiner*—Bernard Konick
*Assistant Examiner*—David K. Moore
*Attorney, Agent, or Firm*—Sughrue, Rothwell, Mion, Zinn & MacPeak

[57] ABSTRACT

Control of a telephone auto-answering device having a caller's message recording mechanism is achieved by monitoring the remaining, non-recorded length of a recording medium during an auto-answering operation, storing the fact that the remaining length becomes short and is insufficient for recording a message of a predetermined duration, and energizing a tape changer or auto-reverse mechanism of the telephone auto-answering device upon termination of the auto-answering operation if the fact that the remaining tape is short is stored, to substitute a new recording medium for the substantially fully recorded medium, thereby insuring the provision of a recording space of at least a predetermined length.

10 Claims, 2 Drawing Figures

TELEPHONE AUTO-ANSWERING DEVICE WITH RECORD MEDIUM SUBSTITUTION

BACKGROUND OF THE INVENTION

1. Field of the Invention

This invention relates to control of a telephone auto-answering device and, more particularly, to a method and apparatus for controlling a telephone auto-answering device having a caller's message recording mechanism.

2. Description of the Prior Art

Conventional telephone auto-answering devices have been designed so that, when one track of a recording tape is completely recorded on, the device is turned off and the auto-answering operation terminates and is not started again if another call is received by the device. Further, the conventional telephone auto-answering devices have the disadvantage that, when a recording tape reaches the end while the device is in the autoanswering operating state, the recording operation is stopped and the device changes to an inoperative state without giving any notification to the caller.

SUMMARY OF THE INVENTION

It is a general object of the present invention to obviate the disadvantages of conventional telephone auto-answering devices.

It is another object of the present invention to provide a method and apparatus for controlling a telephone auto-answering device in which the recording of a message during an auto-answering operation is not interrupted and the message from the caller is completely recorded.

It is still another object of the present invention to provide a method and apparatus for controlling a telephone auto-answering device having a caller's message recording mechanism, in which a tape changer or auto-reverse mechanism in the telephone auto-answering device is actuated when the auto-answering operation terminates if a remaining, non-recorded length of a recording medium is short or comes near its end, and the device is returned to a stand-by state for preparation for another call.

According to the present invention, the conventional telephone auto-answering device, having a caller's message recording mechanism, is controlled such that the recordable space of a recording medium or the length of recording tape, remaining on a tape supply reel, is continuously monitored while the device is recording message signals from a caller. If the remaining tape length becomes less than a predetermined length or insufficient to record a message of a predetermined duration, an indication is stored. Thereafter, when the auto-answering operation terminates, a tape changer or auto-reverse mechanism of the telephone auto-answering device is energized to substitute a new recording medium for the substantially fully recorded medium; and then, the device is returned to a stand-by state for preparation for another call. In this manner the message recording operation of at least the predetermined duration can always be accomplished without interruption.

Specifically, the control apparatus of the telephone auto-answering device constructed in accordance with the present invention comprises a sensor and detector for determining whether a non-recorded length of a recording medium remaining on a supply reel is sufficient for recording a message of a predetermined duration. A memory circuit stores an indication of the detection of an insufficient tape length and a control circuit responsive to the condition of the memory circuit and operable upon termination of the auto-answering operation actuates a tape changer or auto-reverse mechanism of the telephone auto-answering device to substitute a new recording medium for the substantially fully recorded medium when an insufficient length indication is stored.

DESCRIPTION OF THE PREFERRED EMBODIMENT

Figure 1:
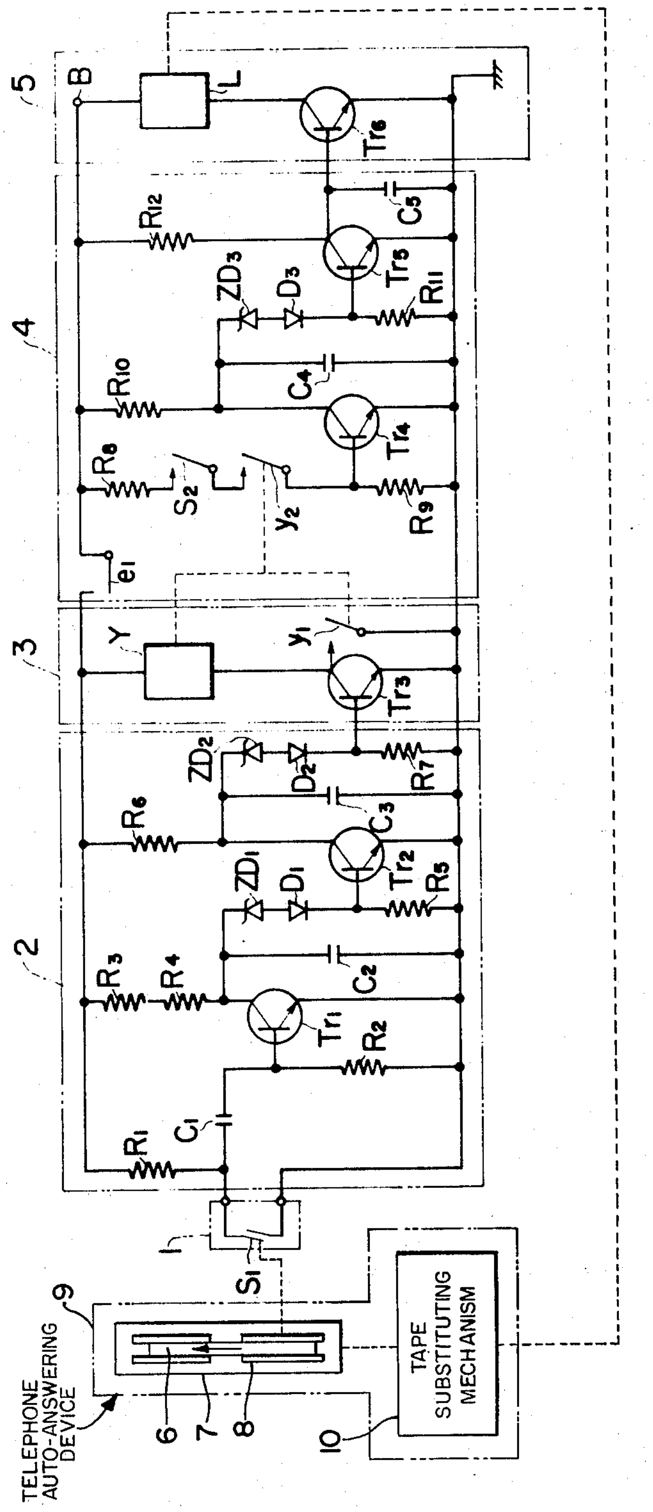
FIG. 1 is a circuit diagram of a preferred embodiment of a control apparatus of a telephone auto-answering device constructed in accordance with the present invention.

Referring to the drawing, there is shown in FIG. 1 an electronic control apparatus constructed in accordance with the present invention, which comprises generally a sensor 1, a detector 2, a memory circuit 3, a control circuit 4, and a drive circuit 5.

More specifically, in the illustrated control apparatus, the sensor 1 functions to sense or monitor the non-recorded, remaining, recordable length of a recording medium or magnetic tape 6 in a recording mechanism 7 and comprises a switch $S_1$, as schematically shown in FIG. 1, whose closing and opening operation is controlled by the instantaneous rate of revolution of a tape supply reel 8 of the recording medium. (The tape supply reel is a part of a conventional telephone auto-answering device 9 in which the instant control apparatus will be incorporated or coupled thereto to cooperate therewith.) For example, the sensor 1 may comprise a set of conductors and insulators provided alternately around the lower portion of a rotary shaft carrying the tape supply reel and a pair of brushes disposed in sliding contact with the alternate conductors and insulators functioning as a switch element. Alternatively, the sensor may comprise a magnet mounted on the lower portion of the rotary shaft carrying the supply reel, magnetized to produce alternately arranged N and S poles and a reed switch element disposed in the vicinity of the magnet.

The detector 2 functions to detect the gradual increase in the rate of closing and opening of the switch $S_1$ as the recording of message signals proceeds, and thereby detecting when the remaining non-recorded length of the recording medium is not sufficient to effect the recording of a message signal more than a predetermined duration, for example, five minutes. The detector circuit comprises transistor $Tr_1$ and $Tr_2$, Zener diodes $ZD_1$ and $ZD_2$, resistors $R_1$ to $R_7$, and capacitors $C_1$ to $C_3$ which are connected as shown in FIG. 1.

The memory circuit 3 comprises a transistor $Tr_3$, a relay coil and a contact $y_1$ of a relay Y, and functions to store the fact that the detector 2 has detected that the remaining non-recorded, recordable length on the supply reel is less than the predetermined length.

The control circuit 4 comprises transistors $Tr_4$ and $Tr_5$, a Zener diode $ZD_3$, a diode $D_3$, a contact $y_2$ of the relay Y, a contact $l_1$ of a load L which will be described later, a switch $S_2$ which is normally open and is closed when the auto-answering operation of the associated telephone autoanswering device terminates, resistors $R_8$ to $R_{12}$, and capacitors $C_4$ and $C_5$. This control circuit 4 switches to a stand-by state in response to the change of state in the memory circuit 3 and, upon termination of the auto-answering operation, energizes the succeeding drive circuit 5 for a predetermined period.

The drive circuit 5 comprises a transistor $Tr_6$ and the load L which may be a solenoid of a cassette changer to exchange tape cassettes or a relay of an auto-reverse mechanism to reverse the tape feed direction. The cassette changer or auto-reverse mechanism is shown as a tape substituting mechanism 10, which may be a part of the associated telephone auto-answering device, and is controlled by the control circuit 4.

Figure 2:
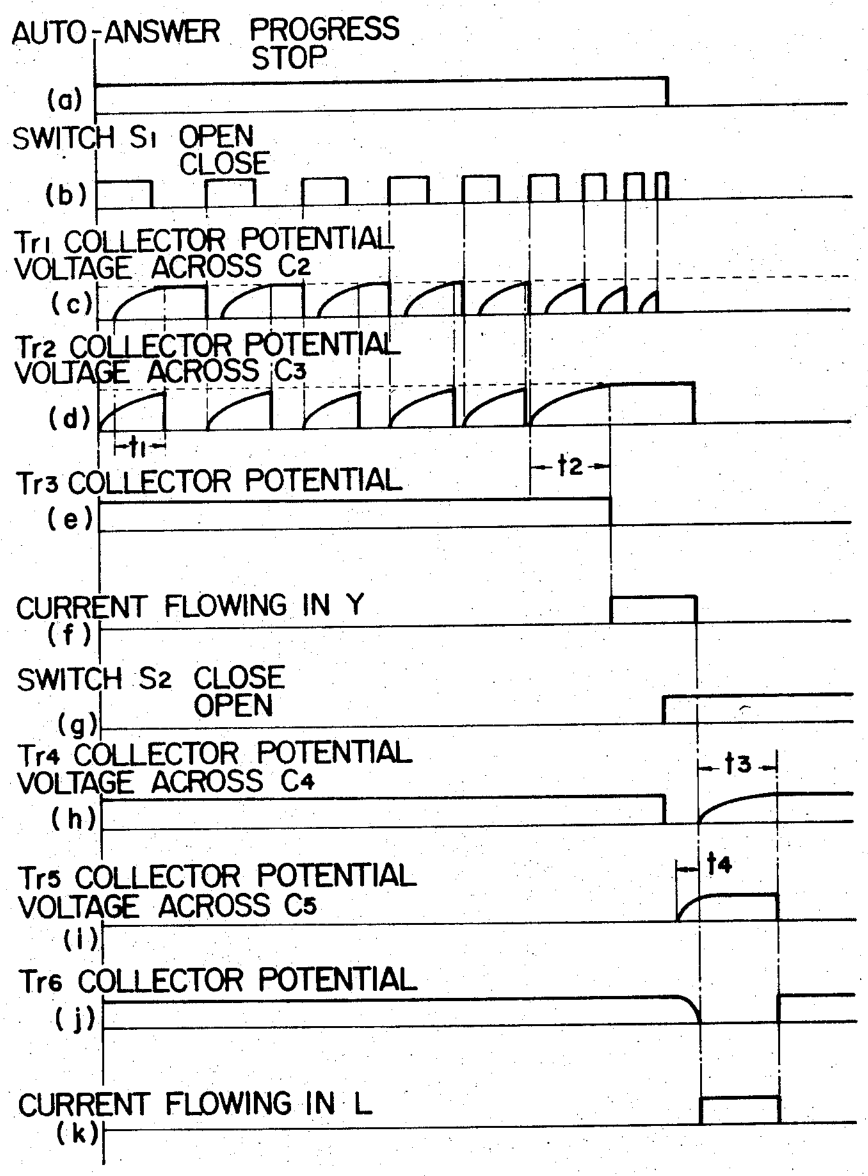
FIG. 2 is an explanatory timing chart showing waveforms appearing in various points of the control apparatus of FIG. 1.

Now the operation of the control apparatus of FIG. 1 will be described with reference to various waveforms shown in the timing chart of FIG. 2.

As a first operating condition, if a sufficient length of the recording tape is still wound on the supply reel while the associated telephone auto-answering device is responding to a calling party (see waveform — *a*), the supply reel is rotated at a relatively low speed. Thus, the pulse signal generated by the switch $S_1$ of the remaining tape length sensor 1 has a large pulse width and a large pulse spacing (waveform — *b*).

Assuming that the switch $S_1$ is now closed, electric current flows from a voltage source B+ through resistor $R_1$ and switch $S_1$ to a ground, not to transistor $Tr_1$, thus, transistor $Tr_1$ turns off. Consequently, charging of capacitor $C_2$ is started through a time-constant circuitry including resistor $R_3$ and $R_4$ and capacitor $C_2$ and, when the voltage across capacitor $C_2$ (waveform — *c*) exceeds the Zener voltage of Zener diode $ZD_1$, Zener current is fed to the base of transistor $Tr_2$. As a result, transistor $Tr_2$ turns on and the electric charge on capacitor $C_3$ discharges through transistor $Tr_2$, so that the voltage across capacitor $C_3$ (waveform — *d*) decreases rapidly. If the voltage across capacitor $C_3$ is yet smaller than the Zener voltage of Zener diode $ZD_2$ at the time of turning on of transistor $Tr_2$, transistor $Tr_3$ does not turn on and remains in the off state.

On the other hand, if switch $S_1$ opens then, base current is supplied through resistor $R_1$ and capacitor $C_1$ to the base of transistor $Tr_1$. Thus, transistor $Tr_1$ turns on and the electric charge on capacitor $C_2$ discharges through transistor $Tr_1$, so that the voltage across capacitor $C_2$ decreases rapidly below the Zener voltage of Zener diode $ZD_1$ and, then, transistor $Tr_2$ turns off. As a result, charging of capacitor $C_3$ is started through a time-constant circuitry including resistor $R_6$ and capacitor $C_3$.

In order to provide the correct operation of the control apparatus shown in FIG. 1, the parameters of the time-constant circuits will be determined to establish the relation that period $t_2$ is longer than period $t_1$, where $t_2$ represents the time that is required for the voltage across capacitor $C_3$ (waveform — *d*) to reach and exceed the Zener voltage of Zener diode $ZD_2$ after turning off of transistor $Tr_2$ and $T_1$ represents the time that is required for the voltage across capacitor $C_2$ (waveform — *c*) to reach and exceed the Zener voltage of Zener diode $ZD_1$ after the turning off of transistor $Tr_1$ in response to closure of switch $S_1$.

In addition, the magnitudes of these time constants have to be determined in the light of on and off time periods of switch $S_1$ when there is a sufficient length of the tape still wound on the supply reel.

The closed circuit period of switch $S_1$ under the first operating condition where the revolution rate of the supply reel is low and a sufficient length of the tape remains non-recorded, is determined so as to be longer than period $t_1$. Then, in the foregoing normal operation, the switch $S_1$ recloses after transistor $Tr_2$ turns off and capacitor $C_3$ starts to charge and before the charge voltage across capacitor $C_3$ reaches the Zener voltage of Zener diode $ZD_2$. In response to this close of switch $S_1$ transistor $Tr_1$ turns off; and, after time $t_1$ elapses, transistor $Tr_2$ turns on to discharge the capacitor $C_3$ through it.

Accordingly, due to the selection of parameters, the voltage across capacitor $C_3$ never exceeds the Zener voltage of Zener diode $ZD_2$ and, thus, transistor $Tr_3$ does not turn on at all (see waveform — *e*), in the normal operating condition.

Thus, when a sufficient length of the tape still remains on the supply reel and the open/close operation of switch $S_1$ takes place slowly, transistor $Tr_3$ does not turn on and, thus, the relay Y is never energized (see waveform — *f*). As a result, transistor $Tr_4$ remains in the off state and the voltage across capacitor $C_4$ in a time-constant circuit including resistor $R_{10}$ and capacitor $C_4$ does not exceed the Zener voltage of Zener diode $ZD_3$ in the early stage of the operation, and transistor $Tr_5$ turns on. Accordingly, transistor $Tr_6$ remains in the off state and does not drive the load L, whereby the normal recording condition is maintained in the system.

Then, as a second operating condition, if the non-recorded length remaining on the supply reel becomes short (for example, the remaining non-recorded length of the tape becomes insufficient to effect recording for five minutes), the revolution rate of the supply reel becomes rapid in comparison with the revolution rate of the first operating condition, thus closing and opening of switch $S_1$ becomes correspondingly more frequent.

Assuming that the switch $S_1$ is just closed; then, transistor $Tr_1$ turns off and the charging of capacitor $C_2$ is started in the same manner as above. After the period of $t_1$, the voltage across capacitor $C_2$ will reach the Zener voltage and transistor $Tr_2$ will turn on if the switch $S_1$ still remains closed. However, in this second operating condition, before period $t_1$ elapses the switch $S_1$ opens. Thus, before the voltage across capacitor $C_2$ reaches the Zener voltage, transistor $Tr_1$ turns on and the charge on capacitor $C_2$ is discharged through transistor $Tr_1$ (see waveform — *c*). In this manner, transistor $Tr_2$ turns on and off repeatedly with a period shorter than interval $t_1$ and, thus, transistor $Tr_2$ can not be turned on. Therefore, capacitor $C_3$ is charged continuously through resistor $R_6$ and, after period $t_2$ the voltage across capacitor $C_3$ (waveform — *d*) reaches the Zener voltage of Zener diode $ZD_2$ whereby the Zener current causes transistor $Tr_3$ to turn on (waveform — *e*). Thus, drive power is supplied to relay Y (waveform — *f*) whereby contact $y_1$ is closed to lock the relay Y in the energized state.

At the same time contact $y_2$ is closed, but, because switch $S_2$ is held open (waveform — *g*) during the auto-answering operation, the load L cannot be energized as is the case where a sufficient length of the tape remains on the supply reel. Accordingly, the normal recording operation proceeds further, but, at the same time, the detection of the fact that the tape length remaining on the supply reel is short, is stored in the relay Y.

In the above condition, if the caller completes his message and hangs up to disconnect the telephone circuit the switch $S_2$ in the associated telephone auto-answering device is closed (waveform — *g*). As a result, transistor $Tr_4$ turns on (waveform — *h*) because the contact $y_2$ has been previously closed and is maintained in that condition due to detection of the insufficient non-recorded tape length. The stored charge on capacitor $C_4$ (waveform — *h*) is discharged through transistor $Tr_4$, thus, transistor $Tr_5$ turns off (waveform — *i*). Consequently, the charging of capacitor $C_5$ (waveform — *i*) is started through resistor $R_{12}$ and, after period $t_4$ determined by a time-constant circuit including resistor $R_{12}$ and capacitor $C_5$ and the operation characteristic of transistor $Tr_6$, transistor $Tr_6$ turns on (waveform — *j*) to cause the load L to be energized (waveform — *k*).

Upon energization of the load L, such as solenoid or relay, a cassette or tape changer (for example, the specification of Japanese Patent Application No. 46-84954 assigned to the instant applicant, filed on Oct. 26, 1971 in Japan, and the specification of U.S. application Ser. No. 300,951, filed Oct. 26, 1972 and claiming priority in part from the Japanese application disclose the cassette changer suitable for this purpose) or a conventional auto-reverse mechanism will operate to change or reverse the tape.

Further, at substantially the same time as the energization of the load L, the contact $l_1$ of load L is open-circuited, so that current applied to the relay Y (as well as the sensor 1, detector 2 and memory circuit 3) is cut off whereby the relay Y becomes inoperative (waveform — *f*). As a result, the contact $y_2$ of relay Y is opened, transistor $Tr_4$ turns off and transistor $Tr_5$ turns on. Because period $t_3$ is required for the voltage across capacitor $C_4$ (waveform — *h*) to reach the Zener voltage of Zener diode $ZD_3$, after the turning off of transistor $Tr_4$, the period $t_3$ elapses between turning off of transistor $Tr_4$ and subsequent turning on of transistor $Tr_5$, so that the load L continues to operate during the period of $t_3$ (waveform — *k*). Thus, if the time $t_3$ is properly pre-selected, the tape or cassette changer or auto-reverse mechanism in the telephone auto-answering device controlled by the instant control apparatus completes its function.

After period $t_3$ transistor $Tr_5$ turns on and transistor $Tr_6$ turns off to deenergize the load L whereby the control apparatus as well as the associated telephone auto-answering device returns to the stand-by state for preparation of a next calling and message recording.

In the illustrated control apparatus, the remaining tape length sensor of the type where the revolution rate of the supply reel is sensed was described. The above function will be achieved differently by using a tape length counter which turns on a switch when a predetermined count is counted, and by adjusting the predetermined count so that the switch is turned on when the count reaches a value representing that of a remaining tape length permitting message recording of only about five minutes, it is possible to store the fact that the remaining tape length has become less than the predetermined length. In case of the use of the above type tape counter, the series connection of the switch actuated by the tape counter with the relay Y in the memory circuit 3 is enough to provide a proper control, and the detector 2 and transistor $Tr_3$ of the memory circuit 3 in the illustrated control apparatus can be removed.

As was described hereinabove, the present invention senses, by use of the remaining tape length detector, whether or not the non-recorded tape length remaining on the supply reel is enough for about five minutes of recording, stores in the memory circuit the shortage of the recordable tape length, and, upon storage, in response to termination of the auto-answering operation, drives the tape changer or auto-reverse mechanism.

Therefore, upon termination of the message recording, the system returns automatically to the stand-by state to thereby permit successive messages to be recorded. Furthermore, if the remaining tape length becomes shorter than the predetermined length permitting five minutes of recording, this situation is memorized and in response to termination of a telephone auto-answering operation a new tape or new recording track is substituted for the substantially fully recorded tape or track. Thus, the recordable tape length for at least five minutes of recording always remains on the supply reel and, thus, the message recording operation of a period up to five minutes cannot be interrupted due to shortage of the recording medium.

While the invention has been particularly shown and described with reference to the preferred embodiment thereof, it will be understood by those skilled in the art that various changes in form and details may be made therein without departing from the spirit and scope of the invention.

I claim:

1. A control apparatus for a telephone auto-answering device having a caller's message recording mechanism which records the message on a first recording medium and also having a means for substituting a new recording medium, said apparatus comprising detecting means operable during an auto-answering operation of the telephone auto-answering device for determining whether the non-recorded length of the first recording medium is sufficient for recording another message of a predetermined duration; memory means responsive to said detecting means for storing the detection of an insufficiency of the non-recorded length; switch means for sensing the hanging up of the caller; and a control means coupled to said memory means, and operable in response to the storage of the detection of the insufficiency of non-recorded length and to the hanging up by the caller indicating termination of the auto-answering operation and the recording of the caller's message, to actuate the substituting means to substitute a new recording medium for the substantially fully recorded first medium.

2. A control apparatus as set forth in claim 1 wherein said detecting means includes a tape length counter which provides a signal when the count exceeds a predetermined value.

3. A control apparatus as set forth in claim 1 wherein said control means includes means for returning the telephone auto-answering device to a stand-by state for preparation for another call after completion of the substitution of the new recording medium.

4. A control apparatus as set forth in claim 1 wherein said mechanism is a tape changer substituting means.

5. A control apparatus as set forth in claim 1 wherein said mechanism is an auto-reverse substituting means.

6. A control apparatus as set forth in claim 1 wherein said detecting means comprises a sensor means for sensing continuously the non-recorded length of the first recording medium and a detector circuit means responsive to said sensor means for detecting when the non-recorded length becomes less than a predetermined length.

7. A control apparatus as set forth in claim 6 wherein said sensor means senses the revolution rate of a tape supply reel in the telephone autoanswering device, and said detector circuit means compares the sensed revolution rate with a predetermined rate.

8. The control apparatus as set forth in claim 6 wherein said detector circuit means includes a first transistor having its base connected to said sensor means; a first RC timing circuit coupled to said first transistor such that the capacitor of said first RC timing circuit discharges through said first transistor when said first transistor is on; a second transistor having its base coupled to the capacitor of said first RC timing circuit said second transistor turning on when said capacitor is fully charged; and a second RC timing circuit coupled to the second transistor and the memory means wherein the capacitor of the second RC timing circuit discharges through said second transistor when said second transistor is on and said memory means is activated when the capacitor of the second RC timing circuit is fully charged.

9. A method of controlling a telephone autoanswering device having a caller's message recording mechanism which records the message on a first recording medium and also having a mechanism for substituting a new recording medium, comprising the steps of monitoring the remaining, non-recorded length of the first recording medium while the device is recording the message from the caller, detecting when the remaining length of the first recording medium becomes less than a predetermined length, storing the detection of the condition when the remaining length becomes shorter than the predetermined length, detecting when the caller hangs up, and actuating said mechanism to substitute a new recording medium for the substantially fully recorded first medium upon detecting said caller's hanging up, termination of the auto-answering operation of the device, and storage of said condition.

10. A control method as specified in claim 9 wherein the step of monitoring includes sensing the revolution rate of a recording medium supply reel provided in the telephone auto-answering device, and the step of detecting includes comparing the sensed revolution rate with a predetermined rate.

* * * * *